Figure 1:
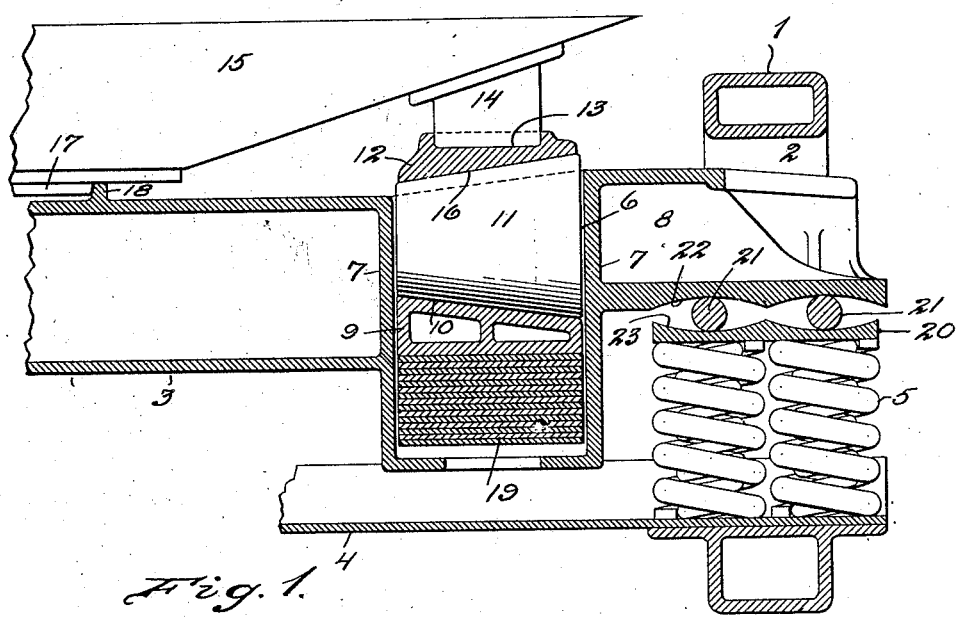

Aug. 5, 1930.          T. H. SYMINGTON ET AL          1,772,328
BOLSTER WITH LATERAL MOTION MOUNTINGS
Original Filed April 9, 1926

Thomas H. Symington
& Percy R. Drenning
INVENTORS

WITNESS
John Milton Jeter

BY Ernest F. Mechlin
ATTORNEY

Patented Aug. 5, 1930

1,772,328

UNITED STATES PATENT OFFICE

THOMAS H. SYMINGTON AND PERCY R. DRENNING, OF BALTIMORE, MARYLAND, ASSIGNORS TO T. H. SYMINGTON & SON, INC., OF BALTIMORE, MARYLAND, A CORPORATION OF MARYLAND

BOLSTER WITH LATERAL-MOTION MOUNTINGS

Original application filed April 9, 1926, Serial No. 100,943. Divided and this application filed August 25, 1927. Serial No. 215,376.

The invention relates to bolsters for railway car trucks and is a division of our copending application for truck bolsters, filed April 9th, 1926, Serial No. 100,943.

The primary object of the invention, generally stated, is to provide a truck bolster and a mounting therefor so constructed and arranged as to permit lateral motion of the truck bolster with respect to the truck side frames.

An important object of the invention is to provide a truck bolster having side bearing means thereon cooperating with side bearing elements depending from a body bolster for sustaining the load, instead of the load being permitted to come upon a center bearing and center plate as is the usual practice, the arrangement being such that the truck and body bolsters may together move with respect to the truck side frames so as to obtain the benefits recognized in the art as resulting from such a construction.

Another object of the invention is to provide a truck bolster and lateral motion permitting means therefor located above the bolster supporting springs which are mounted within the window openings of the truck side frames, the lateral motion device being of such nature as to exert a lifting action upon the truck bolster when lateral motion thereof occurs, there being consequently a natural tendency for the truck bolster to remain in its normal position and to return to such normal or neutral position subsequent to lateral motion.

A further object of the invention is to provide a truck bolster with peculiarly constructed and arranged as well as mounted side bearings which cooperate with depending bearing elements on the body bolster for sustaining the load and permitting relative swivelling movement of the truck and body bolsters, both bolsters being, however, so related that they move together in a longitudinal direction or laterally with respect to the truck when the car travels over curved track, switches, etc.

A still further object is to provide a construction of this character in which the load sustaining side bearings carried by the truck bolster may be spring supported, the springs acting in conjunction with the truck springs for increasing the spring capacity and preventing overloading, the period of oscillation of the two sets of springs being different so as to break up synchronization and reduce, if not eliminate, any tendency of the car to develop roll or side sway, the usual "jiggle" being also eliminated.

A still further object of the invention is to provide a bolster and lateral motion mounting therefor, the latter being located outwardly of the side bearing structures and embodying rollers interposed between the bolster extensions which operate within the side frames and spring plates or followers engaging directly or indirectly upon the truck springs, an advantage being that the lateral motion mounting is independent of the side bearing structure and so positioned that the principal strains will come upon the truck bolsters close to the points or areas which are generally supported, bending moments being consequently reduced, thus making it possible to employ a lighter construction than would otherwise be possible.

An additional object is to provide a truck bolster of this character and mounting therefor which may be used to replace a standard bolster without it being necessary to make any alterations or modifications in the remainder of the truck, the entire assembly consisting of the truck bolster equipped with the side bearings, the lateral motion rollers and the spring plate cooperating therewith, all of these parts being simple and inexpensive to manufacture and easy to assemble and install.

Figure 2:
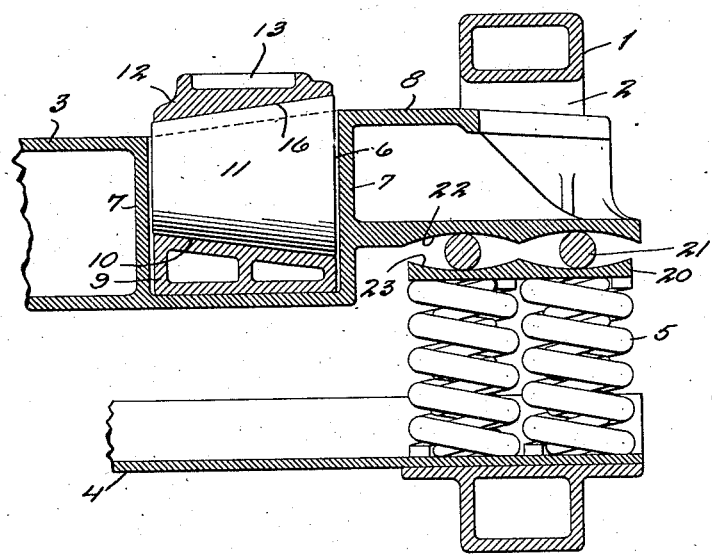

With the foregoing and other objects and advantages in view such as durability, efficiency and the general improvement of the art, the invention preferably consists in the detailed construction and the arrangement and combination of parts to be hereinafter more fully described and claimed, and illustrated in the accompanying drawing in which:

Figure 1 is a vertical sectional view taken longitudinally through one end of a bolster and its mounting constructed in accordance with our invention, and Figure 2 is a similar view showing a slight modification.

Referring more particularly to the drawing, the numeral 1 designates a portion of a truck side frame having the usual window opening 2 for the reception of the end of the truck bolster indicated as a whole at 3. At 4 we have shown the usual spring plank upon which are seated the truck springs 5 which support the bolster.

In accordance with the present invention, each end portion of the bolster 3 is formed with a pocket 6 defined between walls 7 which extend transversely of the bolster. The pocket may be of any desired depth, depending upon the exact nature of the elements to be mounted therein as will be explained. The length and width of the pocket are also matters which may be varied within considerable limits. In most respects the general construction of the bolster 3 may resemble those of conventional pattern, each end having a reduced extension 8 operating within the window opening 2 for cooperation with the supporting springs 5. In so far as supporting webs, ribs and other details are concerned, it is apparent that many modifications may be resorted to in the construction of the bolster, the only requisite being that the structure be sufficiently rigid to meet the requirements of the particular service to which the bolster is to be put, that is to say depending upon the character, weight and capacity of the car in which the bolster is to be used.

Located within each pocket is a supporting member 9 having a preferably inclined upper surface 10 upon which is mounted a roller 11 adapted to move in an arcuate path transversely of the bolster and along the pocket as relative swivelling movement of the truck and body bolsters occurs. The roller preferably projects slightly above the top of the bolster and engaging upon it is a bearing member 12 formed with a recess 13 receiving the depending side bearing element 14 which projects from the underside of the body bolster 15. The body bolster and side bearing element thereon are not shown in detail inasmuch as they do not form any part of the present invention, their illustration being necessary only for the purpose of disclosing the combination. It is intended that the load be sustained entirely by the side bearings, for which reason the body bolster is represented as having its usual center plate 17 guidably received within a flange 18 on the top of the truck bolster at the center thereof, the bottom of the center plate being spaced slightly above the top of the bolster to provide clearance. The sole function of the elements 17 and 18 is to permit relative swivelling movement of the truck and body bolsters while preventing relative longitudinal movement thereof, it being intended that the truck and body bolsters move as a unit when lateral motion occurs. Clearly, any other construction of an equivalent nature might be provided for maintaining the bearing member 12 in operative relation to the body bolster so as to move therewith when relative swivelling movement of the bolsters occurs. Inasmuch as the path of the members 12 is arcuate when relative swivelling movement of the bolsters occurs, the rollers 11 are tapered or frusto-conical in shape so as to travel in accordance with this path. Accordingly the undersurface 16 of each bearing member 12 is inclined oppositely to the inclination of the top surface 10 of each of the supporting members 9.

The elements 9, 11 and 12 above described may be solid in their relation as disclosed in Figure 2 if desired, but in Figure 1 we have illustrated an important additional feature, and that is a bank or group of plate or leaf springs 19 located within each pocket 6 beneath the supporting member 9 therein. While leaf springs are specified it is conceivable that a different variety might be used if found preferable, the purpose being to support the load yieldingly so that hammer-like impacts will not come upon the members 12 and be transmitted thereby to the rollers and supporting members therefor or to the pockets themselves. These springs will clearly operate to absorb shocks and jars and to maintain a close contact between the members 12 and the depending side bearing elements 14 carried by the body bolster.

However, in both forms of the invention we provide lateral motion means here disclosed as comprising seat members 20 which may be formed as spring caps engaged upon the springs 5 and retained against movement in a horizontal direction by any suitable means whatsoever. Rollers 21 are located between the reduced end 8 of the bolster and the seat member 20. In the present instance two of such rollers are shown at each end of the bolster though it should be understood that as many or as few may be employed as desired. It will of course be apparent that when the car rounds a curve the body and truck bolsters together may move laterally of the truck, the reduced extensions 8 at the ends of the truck bolster sliding with respect to the side frames and rolling upon the rollers 21. It is highly desirable and in fact necessary to provide some means for holding the assembled bolsters in normal or neutral position with respect to the side frame and to return them to such position after lateral motion has occurred. Accordingly, we provide the underside of each extension 8 with concavities defining curved surfaces 22 engaged by the rollers and also form each seat member 20 with a corresponding number of oppositely curved surfaces 23 so that when lateral motion of the assembled bolsters occurs a lifting action will result so that upon the cessation of the force tending to produce the lateral motion gravity will act to restore the parts to their normal or initial position. The exact curvature of the surfaces 22 and 23 may of course be varied to meet different conditions which may exist or whatever may be found most satisfactory as the result of actual experiment.

In that form of the invention disclosed in Figure 1 wherein the springs 19 are provided beneath the side bearings, it is intended that the springs have a different period of oscillation from the truck springs so as to break up synchronization and thereby reduce, if not eliminate, any tendency of the car to develop a roll or side sway. Furthermore, the spring capacity of the truck is increased so that there will be less likelihood of overloading and less strain upon the parts. Inasmuch as the load comes upon the side bearings instead of a center bearing and as the side bearings are located near the truck side frames, it is apparent that bending moments in the bolster will be reduced, making it possible to employ a bolster of lighter construction and weight than could be used in the standard or conventional design. Furthermore, the location of the lateral motion rollers directly at the side frames is of benefit inasmuch as the load thereon is transmitted in a practically vertical direction immediately to the side frames. In fact practically every detail necessary to the development of a greatly improved construction has been foreseen and provided for. It is really believed that the construction, operation and advantages will be readily apparent to one skilled in the art without further explanation.

While we have shown and described the preferred embodiment of the invention it should be understood that the disclosure is merely an exemplification of the principles involved and that the right is reserved to make all such modifications or variations as will not depart from the spirit of the invention or the scope of the claims hereunto appended.

Having thus described the invention, we claim:

1. In a railway car truck bolster, a pocket structure at each end thereof, supporting members located within the pockets and each supporting a roller movable transversely of the bolster, means engaging the roller adapted for cooperation with a depending side bearing element on a body bolster, and lateral motion rollers located outwardly of the pockets and beneath the ends of the truck bolster.

2. In a railway car truck bolster, a pocket structure at each end thereof, supporting members located within the pockets, rollers within the pockets movable on said supporting members, means engaging the rollers adapted for cooperation with depending side bearing elements on a body bolster, lateral motion rollers mounted beneath the end portions of the truck bolster outwardly of said pocket structures, and means coacting with said lateral motion rollers for normally maintaining the truck and body bolsters together in centered relation to the truck.

3. In a railway car truck bolster, a pocket structure at each end thereof, supporting members located within the pockets, rollers within the pockets movable on said supporting members, means engaging the rollers adapted for cooperation with depending side bearing elements on a body bolster, lateral motion rollers mounted beneath the end portions of the truck bolster outwardly of said pocket structures, and means coacting with said lateral motion rollers for normally maintaining the truck and body bolsters together in centered relation to the truck and restoring the same to normal central position upon the cessation of a force tending to produce lateral motion.

4. In a railway car truck, side frames, truck springs mounted therein, a truck bolster having end portions vertically movable within the side frames and slidable laterally thereof, a pocket structure within each end portion of the bolster, side bearing means located within the pockets and cooperating with depending side bearing elements on a body bolster for supporting the load, seat members engaged upon the springs, and lateral motion rollers interposed between said seat members and the undersurfaces of the ends of the truck bolster.

5. In a railway car truck, side frames, truck springs mounted therein, a truck bolster having end portions vertically movable within the side frames and slidable laterally thereof, a pocket structure within each end portion of the bolster, side bearing means located within the pockets and cooperating with depending side bearing elements on a body bolster for supporting the load, seat members engaged upon the springs, and lateral motion rollers interposed between said seat members and the undersurfaces of the ends of the truck bolster, each seat member being formed at its top with curved surfaces engaged by the rollers, and the bottom of each end of the bolster having oppositely curved surfaces engaged by the rollers whereby a lifting effect will be obtained upon the occurrence of lateral motion of the assembled bolsters with respect to the side frames.

6. In a railway car truck, side frames, truck springs mounted therein, a truck bolster having end portions vertically movable within the side frames and slidable laterally thereof, a pocket structure within each end portion of the bolster, side bearing means located within the pockets and cooperating with depending side bearing elements on a body bolster for supporting the load, seat members engaged upon the springs, and lateral motion rollers interposed between said seat members and the undersurfaces of the ends of the truck bolster, each seat member being formed at its top with curved surfaces engaged by the rollers, and the bottom of each end of the bolster having oppositely curved surfaces engaged by the rollers whereby a lifting effect will be obtained upon the occurrence of lateral motion of the assembled bolsters with respect to the side frames, and other springs located beneath the side bearings and yieldably supporting the same.

7. In a railway car truck, side frames, truck springs mounted therein, a truck bolster having end portions vertically movable within the side frames and slidable laterally thereof, a pocket structure within each end portion of the bolster, side bearing means located within the pockets and cooperating with depending side bearing elements on a body bolster for supporting the load, seat members engaged upon the springs, and lateral motion rollers interposed between said seat members and the undersurfaces of the ends of the truck bolster, each seat member being formed at its top with curved surfaces engaged by the rollers, and the bottom of each end of the bolster having oppositely curved surfaces engaged by the rollers whereby a lifting effect will be obtained upon the occurrence of lateral motion of the assembled bolsters with respect to the side frames, and other springs located beneath the side bearings and yieldably supporting the same, the second named springs having a different period of oscillation from the truck springs for breaking up synchronization.

8. In a railway car truck, side frames, a truck bolster having its ends mounted for vertical movement within the side frames and movable laterally with respect to the side frames, a pocket structure within each end of the bolster, a supporting member within the pocket, a tapered roller movable on said supporting member, a member engaged upon the roller and formed to receive a depending side bearing element on a body bolster whereby the truck and body bolsters may have relative swivelling movement but yet restrained from relative longitudinal movement, a seat member within each side frame, truck springs located within the side frames beneath said seat members, and lateral motion rollers interposed between the seat members and the end portions of the bolster outwardly of the pockets therein.

9. In a railway car truck, side frames, a truck bolster having its ends mounted for vertical movement within the side frames and movable laterally with respect to the side frames, a pocket structure within each end of the bolster, a supporting member within the pocket, a tapered roller movable on said supporting member, a member engaged upon the roller and formed to receive a depending side bearing element on a body bolster whereby the truck and body bolsters may have relative swivelling movement but yet restrained from relative longitudinal movement, a seat member within each side frame, truck springs located within the side frames beneath said seat members, lateral motion rollers interposed between the seat members and the end portions of the bolster outwardly of the pockets therein, and a bank of plate springs within each pocket beneath the supporting member therein.

In testimony whereof we affix our signatures.

THOMAS H. SYMINGTON.
PERCY R. DRENNING.